(12) United States Patent
Nainar

(10) Patent No.: US 11,593,121 B1
(45) Date of Patent: Feb. 28, 2023

(54) REMOTELY DISABLING EXECUTION OF FIRMWARE COMPONENTS

(71) Applicant: American Megatrends International, LLC, Norcross, GA (US)

(72) Inventor: Sivasakthivel Nainar, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 467 days.

(21) Appl. No.: 16/128,301

(22) Filed: Sep. 11, 2018

(51) Int. Cl.
*G06F 9/4401* (2018.01)
*G06F 21/57* (2013.01)

(52) U.S. Cl.
CPC .......... *G06F 9/4411* (2013.01); *G06F 21/575* (2013.01)

(58) Field of Classification Search
CPC .................................................... G06F 9/4411
See application file for complete search history.

(56) References Cited

U.S. PATENT DOCUMENTS

| | | | |
|---|---|---|---|
| 2011/0239184 A1* | 9/2011 | Feigen | G06F 8/24 717/104 |
| 2014/0351571 A1* | 11/2014 | Jacobs | G06F 21/572 713/2 |
| 2016/0210161 A1* | 7/2016 | Rosset | G06F 9/4416 |
| 2018/0026830 A1* | 1/2018 | Bhatia | H04L 41/0266 709/223 |

OTHER PUBLICATIONS

Wikipedia contributors. "System Management Mode." Wikipedia, Jul. 16, 2017, en.wikipedia.org/wiki/System_Management_Mode. Retrieved from Archive.org, https://web.archive.org/web/20170716061339/https://en.wikipedia.org/wiki/System_Management_Mode on Sep. 24, 2021. (Year: 2017).*

"JSON Format (OData Version 2.0)," JSON Format (OData Version 2.0) OData—the Best Way to REST (Open Data Protocol, Sep. 24, 2014), https://www.odata.org/documentation/odata-version-2-0/json-format/. (Year: 2014).*

* cited by examiner

*Primary Examiner* — Paul Yen
(74) *Attorney, Agent, or Firm* — Newport IP, LLC; Leonard J. Hope

(57) ABSTRACT

The components of a firmware that are to be executed are identified, such as firmware device drivers and SMI interrupt handlers. Performance data is also obtained for the components. An inventory identifying the components and the performance data are provided to a BMC. The BMC provides the inventory and the performance data to a remote management client through an out-of-band ("OOB") network connection. The BMC might also receive a blacklist instruction from the management client. The blacklist instruction provides an indication to the BMC that one or more of the components of the firmware are not to be executed by the computing system. The BMC provides the blacklist instruction to the firmware. The firmware adds the component, or components, identified in the blacklist instruction to a blacklist. The next time the computing system is booted, the firmware will not execute the components identified in the blacklist.

12 Claims, 7 Drawing Sheets

REMOTELY DISABLING EXECUTION OF FIRMWARE COMPONENTS

BACKGROUND

Scalability in today's data center is increasingly achieved with horizontal, scale-out solutions. As a result, many data centers include hundreds of thousands or even millions of server computers. Management of such a large number of server computers can be very difficult. For example, it can be extremely difficult to keep such a large number of server computers secure and running efficiently.

It is with respect to these and other considerations that the disclosure made herein is presented.

SUMMARY

Technologies are described herein for remotely disabling execution of firmware components. Through implementations of the disclosed technologies, system administrators can remotely disable execution of firmware components. For example, a system administrator might learn that a particular component of a firmware poses a security risk, is crashing, or is executing inefficiently. The system administrator can utilize the disclosed technologies to remotely disable execution of this component such as, for example, by servers in a data center. This enables more secure and efficient execution of server computers which, in turn, can save computing resources such as, but not limited to, processor cycles, memory, network bandwidth, and storage. Technical benefits other than those specifically mentioned herein can also be realized through implementations of the disclosed technologies.

In order to provide the technologies described herein, a computing system firmware is provided that is configured for execution on a computing system having a baseboard management controller ("BMC"). A BMC is a specialized service processor that monitors the physical state of a computing system using sensors and communicates with a system administrator through an out-of-band ("OOB") network connected to a management client. A BMC can also perform other functions, including the functionality disclosed herein.

The disclosed firmware is configured to identify components of the firmware that are to be executed. The components can include for example, and without limitation, firmware drivers and system management ("SMI") interrupt handlers. The firmware can identify the components to be executed at boot time of the computing system or at another time. The firmware can also obtain performance data for the component such as, for example, data describing the execution of the components, whether the components have crashed, and other types of data.

Once data identifying the components to be executed and the performance data have been gathered, the firmware can transmit an inventory identifying the components to the BMC. The firmware can also transmit the performance data to the BMC. The firmware might communicate with the BMC using the representational state transfer ("REST") protocol. The firmware might also utilize using a JavaScript Object Notation ("JSON") format based on an Open Data Protocol ("OData") to format the inventory and the performance data.

The BMC receives the inventory and the performance data from the firmware and stores this data internally. The BMC can also provide the inventory and the performance data to a remote management client through an OOB network connection. Subsequently, the BMC might receive a blacklist instruction from the management client. The blacklist instruction provides an indication to the BMC that one or more of the components of the firmware are not to be executed by the computing system.

The BMC can, in turn, provide the blacklist instruction to the firmware. The firmware adds the component, or components, identified in the blacklist instruction to a "blacklist." The blacklist includes data identifying components of the firmware that are not to be executed. The next time the computing system is booted, the firmware will not execute the components identified in the blacklist. Other components of the firmware that are dependent upon components identified in the blacklist will also not be executed.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for remotely disabling execution of firmware components. As discussed briefly above, implementations of the disclosed technologies can enable more secure, reliable, and efficient execution of server computers which, in turn, can save computing resources such as, but not limited to, processor cycles, memory, network bandwidth, and storage. Technical benefits other than those specifically mentioned herein can also be realized through implementations of the disclosed technologies.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
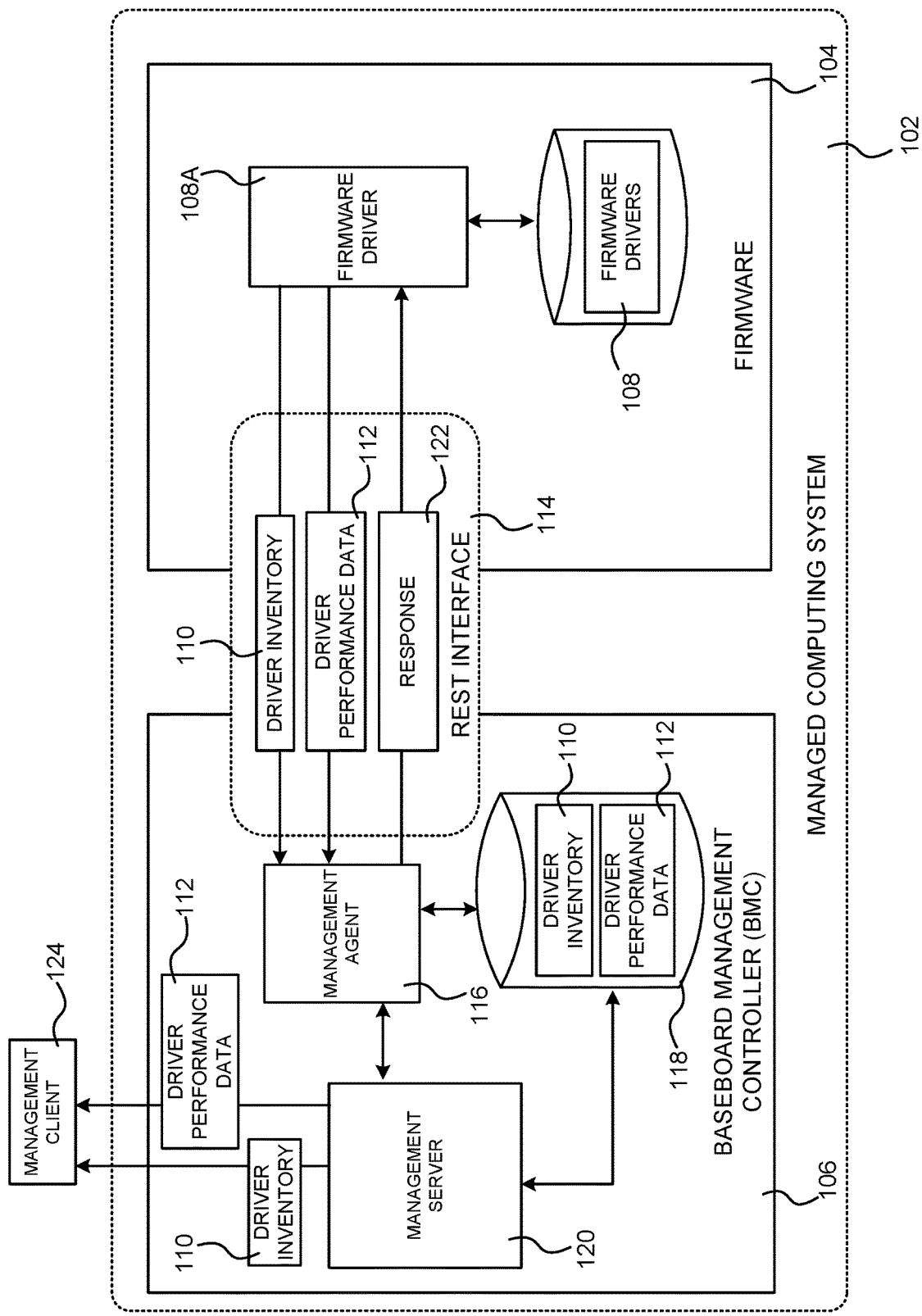
FIGS. 1 and 2 are software architecture diagrams illustrating aspects of a mechanism for remotely disabling execution of firmware components according to one or more embodiments presented herein.
Figure 2:
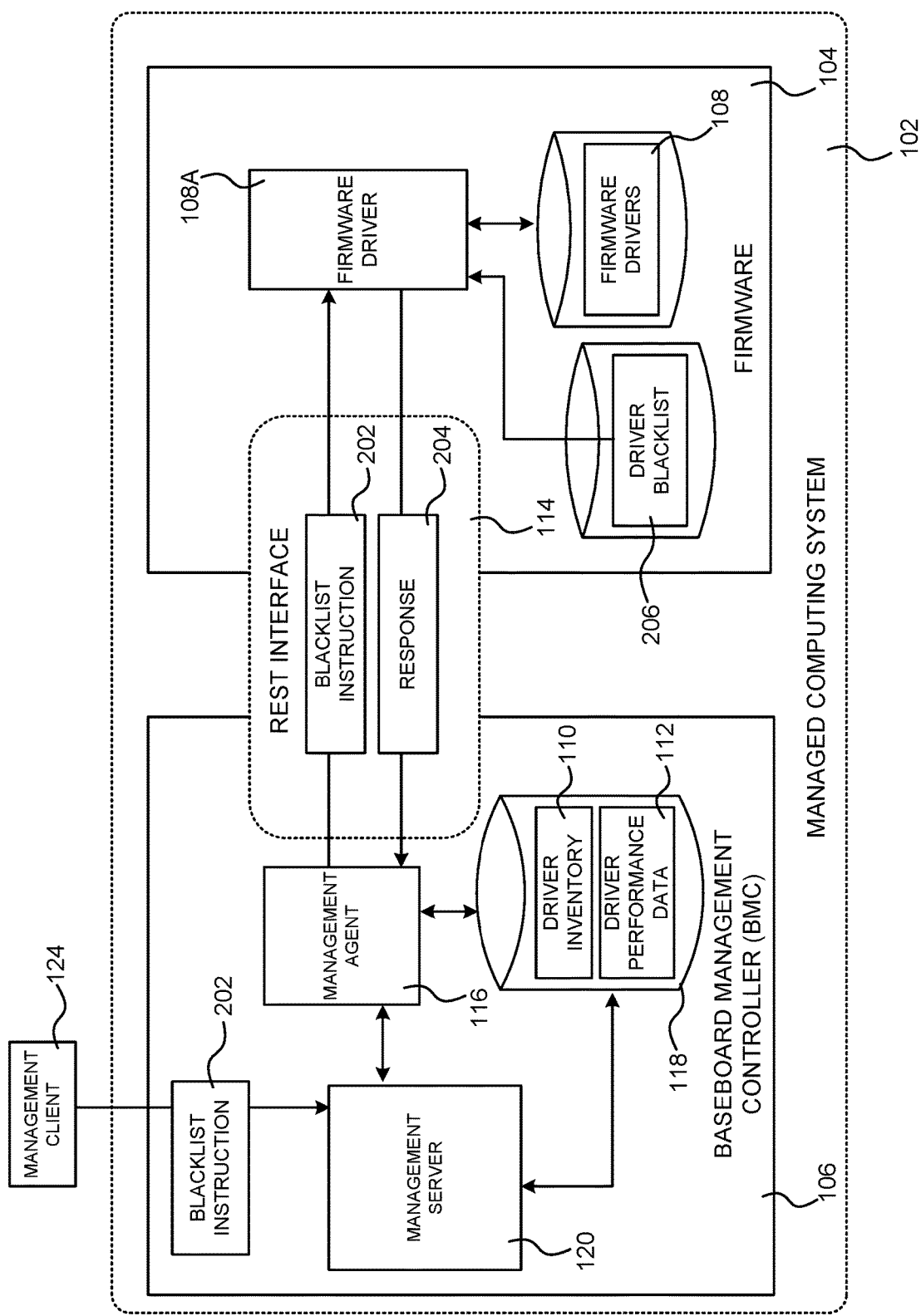

FIGS. 1 and 2 are software architecture diagrams illustrating aspects of a mechanism for remotely disabling execution of firmware components according to one or more embodiments presented herein. In particular, FIG. 1 illustrates aspects of the configuration of a managed computing system 102 that implements aspects of the disclosed technologies.

As shown in FIG. 1, the managed computing system 102 is configured with a baseboard management controller ("BMC") 106. As discussed briefly above, a BMC 106 is a specialized service processor that monitors the physical state of a computer, such as the managed computing system 102, using sensors and communicates with a system administrator through an out-of-band ("OOB") network (not shown in FIG. 1) connected to a management client 124. The BMC 106 can also perform other functions, such as those described below.

In order to provide various aspects of its functionality, some of which are described herein, the BMC 106 also communicates with a firmware 104 of the managed computing system 102. The firmware 104 can be implemented to be compliant with the Unified Extensible Firm Interface ("UEFI") Specification, which is described in greater detail below with regard to FIG. 6. Other types of firmware can be utilized in other embodiments.

Execution of the firmware 104 can involve the execution of many components such as, but not limited to, firmware drivers 108. The firmware drivers 108 might be UEFI drivers or other types of drivers utilized by other firmware implementations. In this regard, it is to be appreciated that while the technologies disclosed herein are primarily discussed (and illustrated in the FIGS.) in the context of firmware drivers 108, the technologies disclosed herein can be utilized with other types of executable components of a firmware 104. For instance, the technologies described herein can be utilized to remotely prevent the execution of system management interrupt ("SMI") handlers and other types of software components.

In one configuration, the firmware 104 executes a firmware driver 108A configured to provide aspects of the functionality disclosed herein. In particular, the firmware driver 108A is a software component that obtains data identifying the software components (e.g. the firmware drivers 108 or SMI handlers) that are executing or are to be executed by the firmware 104. The firmware driver 108A can, for example, identify those firmware drivers 108 that are to be executed by the firmware 104 at a boot time of the managed computing system 102. As used herein, the term "boot time" refers to the time period after the firmware 104 begins executing and before the operating system of the managed computing system 102 starts to load. The firmware driver 108A can generate a driver inventory 110 that identifies the components that are executing or are to be executed by the firmware 104.

The firmware driver 108A can also obtain performance data for the components (e.g. the firmware drivers 108) executed by the firmware 104. For example, and without limitation, the firmware driver 108A might collect data describing the execution of the components, whether the components have crashed, and other types of data describing the performance of software components executed by the firmware 104. In the case of firmware drivers 108, the firmware driver 108A can generate driver performance data 112 that describes the performance of the firmware drivers 108.

Once the software components to be executed and the associated performance data have been gathered, the firmware can transmit an inventory identifying the components to the BMC 106. In the example shown in FIG. 1, for instance, the firmware driver 108A transmits the driver inventory 110 and the driver performance data 112 to a management agent 116 executing within the BMC 106.

In some configurations, the firmware driver 108A utilizes a representational state transfer ("REST") interface 114 to communicate with the BMC 106. In some configurations, for example, the firmware driver 108A generates a REST hypertext transport protocol ("HTTP") request to the management agent 116 of the BMC 106 that is compatible with the REDFISH management standard. REDFISH is a successor to previous manageability interfaces created by the Distributed Management Task Force ("DMTF"). REDFISH is an open industry standard specification and schema for simple, modern, and secure management of scalable platform hardware, such as server computers located in data centers.

The REDFISH specification and schema specifies a REST interface 114 and utilizes JAVASCRIPT object notation ("JSON") and the Open Data Protocol ("OData") to integrate management solutions within existing toolchains. The driver inventory 110 and the driver performance data 112 can be expressed using a JSON format that is based on OData and provided to the BMC using a REST HTTP request.

Although the embodiments disclosed herein are described primarily as utilizing REDFISH, the REST HTTP requests and responses disclosed herein can be formatted according to other specifications in other embodiments. In one configuration, the REST interface 114 is implemented using a REST over IPMI interface, such as that described in U.S. patent application Ser. No. 15/893,503, which was filed on Feb. 9, 2018, entitled "REST OVER IPMI INTERFACE FOR FIRMWARE TO BMC COMMUNICATION", and which is assigned to the assignee of the instant patent application.

As shown in FIG. 1, the management agent 116 of the BMC 106 receives the inventory of the firmware components (e.g. the driver inventory 110) and the performance data (e.g. the driver performance data 112) from the firmware driver 108A and stores this data internally, such as within an appropriate data store 118. The management agent 116 can also provide a response 122, such as an HTTP REST response, indicating that the driver inventory 110 and the driver performance data 112 have been received.

The BMC 106 can also provide the inventory and the performance data to a remote management client 124 through an OOB network connection (not shown in FIG. 1). In some embodiments, for example, the management server 120 exposes a REDFISH-compatible interface (not shown in FIG. 1) through which a management client 124 can request the inventory and performance data. In response to receiving such a request, the management server 120 can retrieve the requested inventory and performance data (e.g. the driver inventory 110 and the driver performance data 112) from the data store 118 and provide this data to the management client 124. Additional details regarding these aspects will be provided below with regard to FIG. 3.

FIG. 2 illustrates additional aspects of the configuration of the managed computing system 102 for remotely disabling execution of firmware components. As discussed briefly above, a user of the management client 124, such as a system administrator, might learn that one of the components of the firmware 104 has a security vulnerability or might examine the performance data and determine that a component of the firmware is not executing properly. In response thereto, the user might provide an instruction to the management client 124 (e.g. through an appropriate graphical user interface or command line interface), referred to herein as a blacklist instruction 202, indicating that the component is not to be executed by the firmware 104.

The blacklist instruction 202 provides an indication to the BMC 106 that one or more of the components (e.g. firmware drivers 108) of the firmware 104 are not to be executed by the computing system 102. The management client 124 provides the blacklist instruction 202 to the management server 102 of the BMC 106.

The BMC 106 can, in turn, provide the blacklist instruction 202 to the firmware driver 108A through the REST interface 114. The firmware driver 108A adds the component, or components, identified in the blacklist instruction 206 to a blacklist, in the illustrated example a driver blacklist 206. The blacklist includes data identifying components (e.g. firmware drivers 108) of the firmware 104 that are not to be executed. Additional details regarding these aspects will be provided below with regard to FIG. 4.

Upon the next boot of the managed computing system 102, the firmware 104 will examine the driver blacklist 206 to identify those firmware components that are not to be executed. The firmware 104 will prevent the components identified in the blacklist from executing. Other components of the firmware 104 that are dependent upon software components identified in the blacklist will also not be executed. Additional details regarding these aspects will be provided below with regard to FIG. 5.

It is to be appreciated that FIGS. 1 and 2, and the other FIGS., have been simplified for discussion purposes, and that many other software and hardware components can be utilized to implement the functionality disclosed herein. For example, and without limitation, various networks and networking components can be utilized to connect the management client 124 to the BMC 106. In this regard, it is also to be appreciated that while only a single managed computing system 102 and a single management client 124 have been illustrated in FIGS. 1 and 2, many such computing systems can be utilized in various configurations.

Figure 3:
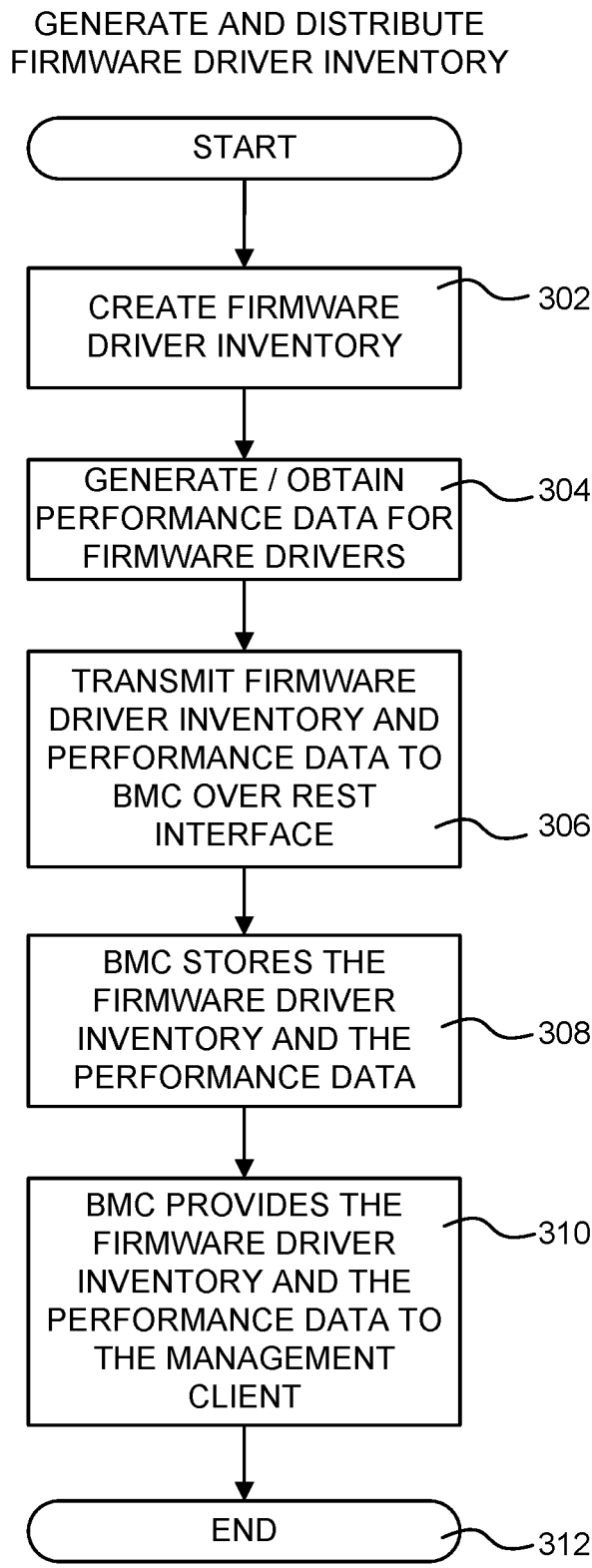
FIGS. 3-5 are flow diagrams showing routines that illustrate aspects of the operation of the computing system shown in FIGS. 1 and 2 for remotely disabling execution of firmware components, according to one embodiment presented herein.
Figure 4:
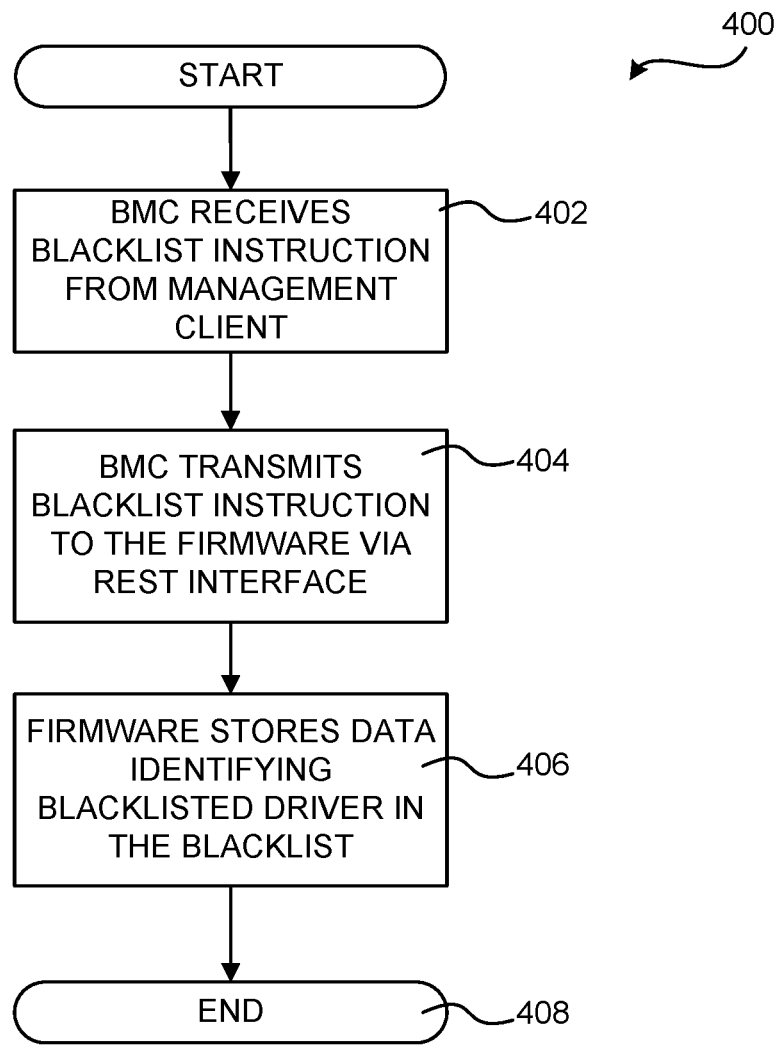
Figure 5:
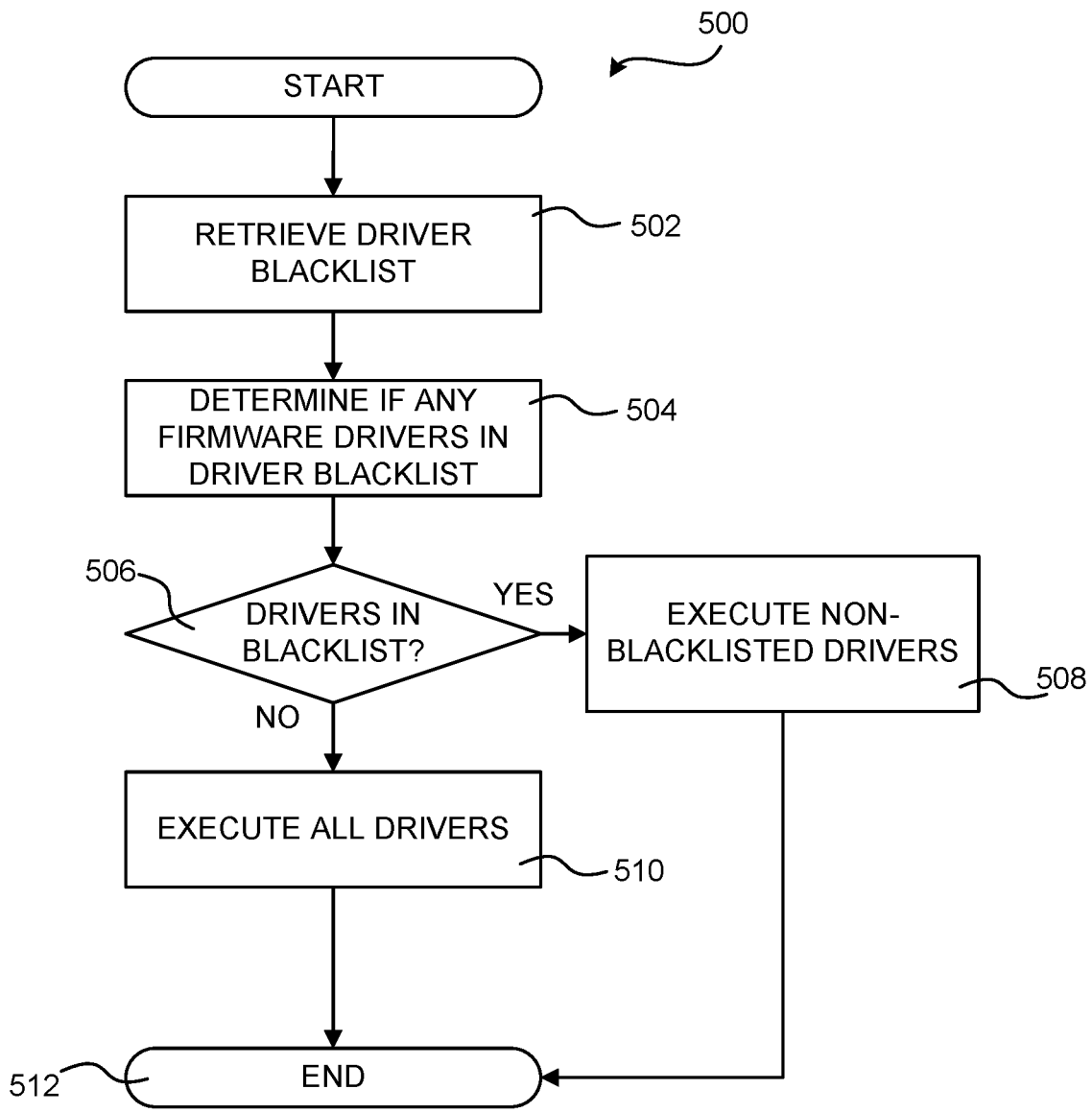

FIGS. 3-5 are flow diagrams showing routines 300, 400, and 500, respectively, that illustrate aspects of the operation of the managed computing system 102 shown in FIG. 1 for remotely disabling execution of firmware components, according to one embodiment presented herein. It is to be appreciated that the logical operations described herein with respect to FIGS. 3-5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 shown in FIG. 3 illustrates one method for generating and distributing a component inventory, in this example the firmware driver inventory 110 described above with regard to FIGS. 1 and 2. The routine 300 begins at operation 302, where the firmware driver 108A creates the driver inventory 110. As discussed above, the firmware driver inventory 110 identifies firmware drivers 108 that are to be executed by the firmware 104. A similar inventory might be generated for other software components in other configurations, such as SMI handlers. The firmware driver inventory 302 might be generated at boot time of the managed computing system 102 or at another time.

From operation 302, the routine 300 proceeds to operation 304, where the firmware driver 108A generates or obtains the performance data for the software components identified at operation 302, in this example the driver performance data 112. As discussed above, the driver performance data 112 can include data describing the execution of the firmware drivers 108, whether the firmware drivers 108 have crashed, and other types of data describing the performance of the firmware drivers 108.

From operation 304, the routine 300 proceeds to operation 306, where the firmware driver 108A transmits the driver inventory 110 and the driver performance data 112 to the BMC 106 over the REST interface 114. The routine 300 then proceeds to operation 308, where the BMC 106 stores the driver inventory 110 and the driver performance data 112, such as in the data store 118. The BMC 106 can then provide the driver inventory 110 and the driver performance data 112 to the management client 124 via an OOB connection in the manner described above. The routine 300 then proceeds from operation 310 to operation 312, where it ends.

The routine 400 shown in FIG. 4 illustrates one method for adding software components, firmware drivers 108 in the illustrated example, to a blacklist, such as the driver blacklist 206 shown in FIG. 2. The routine 400 begins at operation 402, where the BMC 106 receives a blacklist instruction 202 from the management client 124. The routine 400 then proceeds to operation 404, where the BMC transmits the blacklist instruction 202 to the firmware driver 108A via the REST interface 114. The firmware driver 108A, in turn, updates the driver blacklist 206 with data identifying the firmware driver 108 identified in the blacklist instruction 202. The routine 400 then proceeds from operation 406 to operation 408, where it ends.

The routine 500 shown in FIG. 5 illustrates one method for preventing execution of software components, firmware drivers 108 in this example, identified in a remotely-specified blacklist. The process illustrated in FIG. 5 is performed at boot time of the managed computing system 102 in some configurations.

The routine 500 begins at operation 502, where the firmware driver 108A, or another firmware component, retrieves the driver blacklist 206. The driver blacklist 206 is stored in a UEFI variable store in some configurations. The routine 500 then proceeds from operation 502 to operation 504.

At operation 504, the firmware 104 determines if any firmware drivers 108 are identified in the driver blacklist 206. If so, the routine 500 proceeds from operation 506 to operation 508, where the firmware 104 executes only those drivers 108 that are not identified in the blacklist 206. The firmware 104 prevents firmware drivers 108 that are identified in the blacklist 206 from being executed. Additionally, any firmware drivers 108 whose execution is dependent upon the execution of the non-executed drivers 108 will not be executed.

If, at operation 506, the firmware 104 determines that no drivers 108 are identified in the blacklist 206, the routine 500 proceeds from operation 506 to operation 510, where all of the drivers 108 of the firmware 104 are executed in a standard fashion. From operations 508 and 510, the routine 500 proceeds to operation 512, where it ends.

Figure 6:
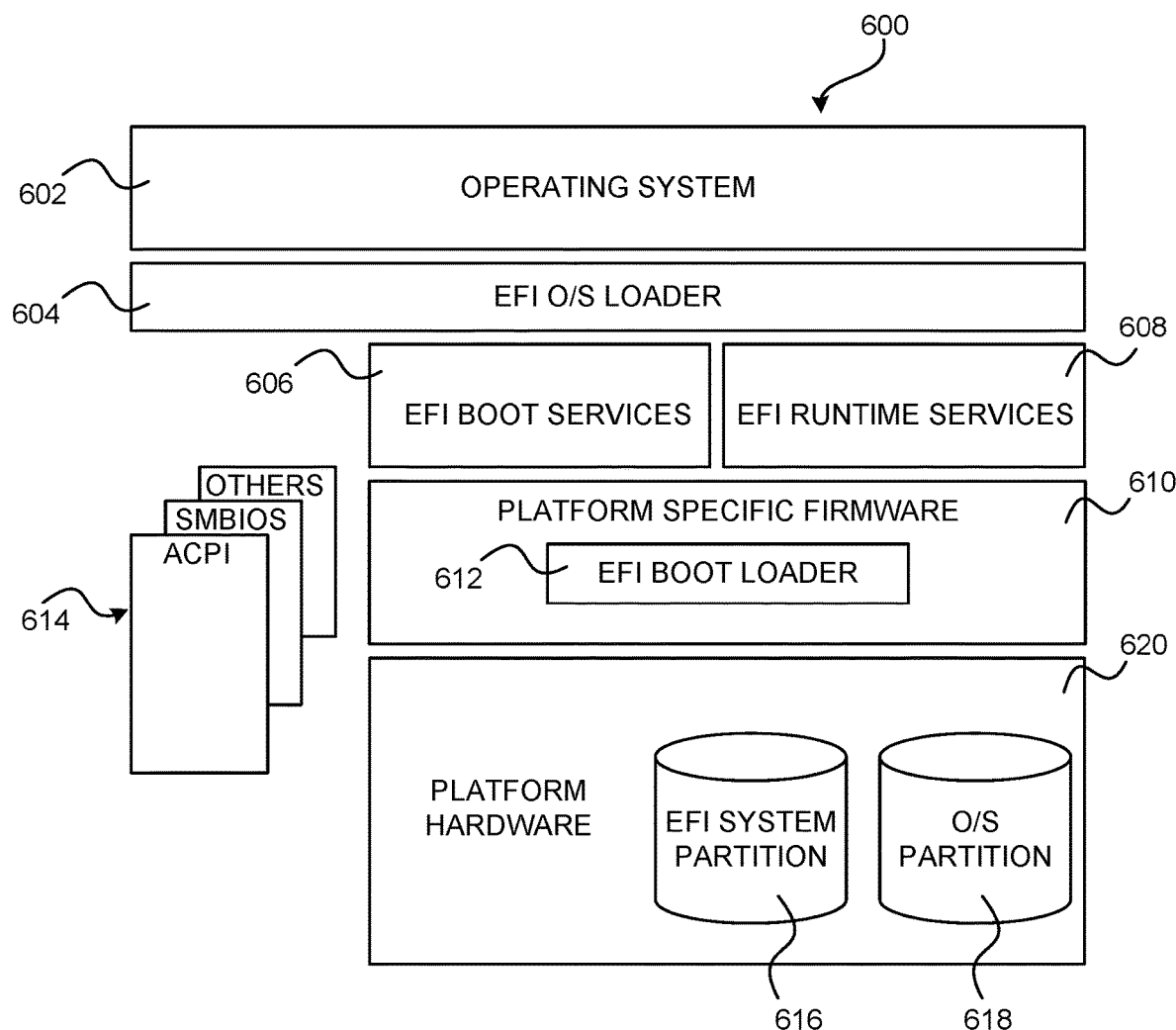
FIG. 6 is a software architecture diagram illustrating a software architecture for a unified extensible firmware interface ("UEFI")-compliant firmware that provides an operating environment for aspects of the technologies presented herein in one embodiment.

Turning now to FIG. 6, a software architecture diagram will be described that illustrates an architecture for a UEFI Specification-compliant firmware 600 that can be configured to provide and/or utilize aspects of the technologies disclosed herein. In particular, the firmware architecture shown in FIG. 6 can be utilized to implement the firmware 104 described above. The firmware 104 can also be implemented in other ways in other configurations.

The UEFI Specification describes an interface between an operating system 602 and a UEFI Specification-compliant firmware 600. The UEFI Specification also defines an interface that a firmware 600 can implement, and an interface that an operating system ("OS") 602 can use while booting. How a firmware implements the interface can be left up to the manufacturer of the firmware. The UEFI Specification also defines a way for an operating system 602 and a firmware 600 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 6, the architecture can include platform hardware 620, such as that described below with regard to FIG. 19, and an operating system 602. A boot loader 612 for the operating system 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete operating system 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the Advanced Configuration and Power Management Interface ("ACPI") and the System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 602 and system firmware 600, the Framework is a group of specifications that together describe a firmware implementation that has been designed to perform the full range of operations that are required to initialize a platform from power on through transfer of control to the operating system 602. The specifications that make up the Framework, which are also available from INTEL CORPORATION, are also expressly incorporated herein by reference.

Figure 7:
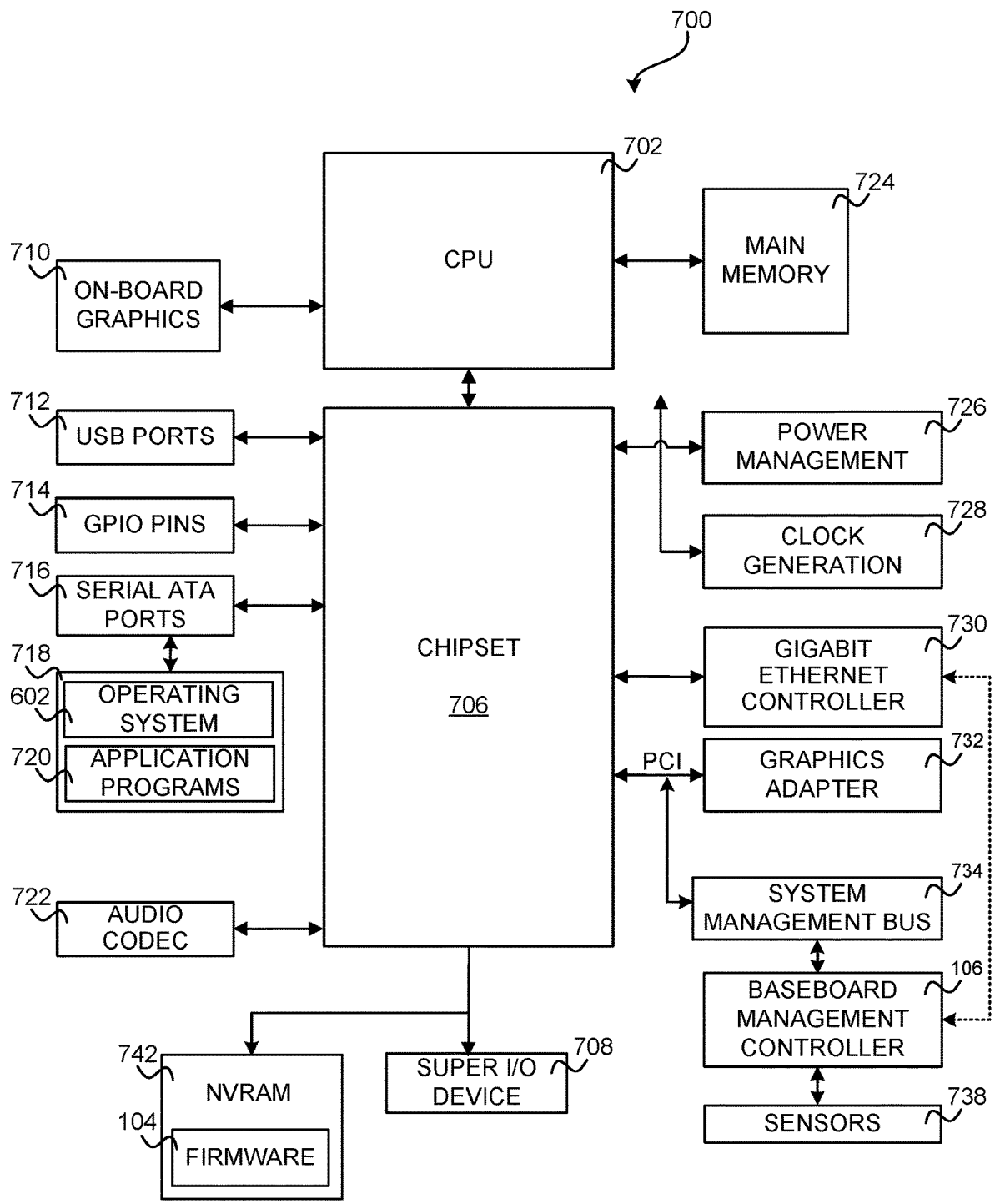
FIG. 7 is a computer architecture diagram that shows an illustrative architecture for a computer that can implement the technologies disclosed herein.

Referring now to FIG. 7, a computer architecture diagram that shows an illustrative architecture for a computer that can provide an operating environment for the technologies presented herein will be described. For example, and without limitation, the computer architecture shown in FIG. 7 can be utilized to implement the managed computing system 102 and/or any of the other computing systems disclosed herein.

FIG. 7 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 7 shows an illustrative computer architecture for a computer 700 that can implement the technologies described herein. The illustrative computer architecture shown in FIG. 7 is for the computer 700, and includes a baseboard, or "motherboard", which is a printed circuit board to which a multitude of components or devices can be connected by way of a system bus or other electrical communication path. In one illustrative configuration, a central processing unit ("CPU") 702 operates in conjunction with a chipset 706. The CPU 702 is a central processor that performs arithmetic and logical operations necessary for the operation of the computer 700. The computer 700 can include a multitude of CPUs 702. Each CPU 702 might include multiple processing cores.

The CPU 702 provides an interface to a random access memory ("RAM") used as the main memory 724 in the computer 700 and, possibly, to an on-board graphics adapter 710. The chipset 706 provides an interface between the CPU 702 and the remainder of the computer 700.

The chipset 706 can also be responsible for controlling many of the input/output functions of the computer 700. In particular, the chipset 706 can provide one or more universal serial bus ("USB") ports 712, an audio codec 722, a Gigabit Ethernet Controller 732, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC'97") and Dolby TrueHD among others.

The chipset 706 can also include functionality for providing networking functionality through a Gigabit Ethernet Controller 730. The Gigabit Ethernet Controller 730 is capable of connecting the computer 700 to another computer via a network. Connections which can be made by the Gigabit Ethernet Controller 730 can include LAN or WAN connections. LAN and WAN networking environments are commonplace in offices, enterprise-wide computer networks, intranets, and the Internet.

The chipset 706 can also provide a bus for interfacing peripheral card devices such as a graphics adapter 732. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The chipset 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the chipset 706.

The chipset 706 is also configured to provide one or more interfaces for connecting mass storage devices to the computer 700. For instance, according to one configuration, the chipset 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. An application program is software that runs on top of the operating system 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the chipset 706, and their associated computer-readable storage media, provide non-volatile storage for the computer 700. Although the description of computer-readable storage media contained herein refers to a mass storage device, such as a hard disk or CD-ROM drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the chipset 706 for connecting a Super I/O device 708. The Super I/O device 708 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 742 for storing firmware 104 that includes program code containing the basic routines that help to start up the computer 700 and to transfer information between elements within the computer 700 as discussed above.

It should be appreciated that the program modules disclosed herein, including the firmware 104, can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the Gigabit Ethernet Controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 724 and/or NVRAM 704. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the chipset 706 can include a system management bus 734. As discussed above, when utilized to implement the managed computing system 102, the system management bus 734 can include a BMC 106. As discussed above, the BMC 106 is a microcontroller that monitors operation of the computer 700. In a more specific configuration, the BMC 106 monitors health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the BMC 106 is communicatively connected to one or more components by way of the system management bus 734 in some configurations.

In one configuration, these components include sensor devices 738 for measuring various operating and performance-related parameters within the computer 700. The sensor devices 738 can be either hardware or software based components configured or programmed to measure or detect one or more of the various operating and performance-related parameters.

The BMC 106 functions as the master on the system management bus 734 in most circumstances but can also function as either a master or a slave in other circumstances. Each of the various components communicatively connected to the BMC 106 by way of the system management bus 734 is addressed using a slave address. The system management bus 734 is used by the BMC 106 to request and/or receive various operating and performance-related parameters from one or more components, such as the firmware 104, which are also communicatively connected to the system management bus 734. The BMC 106 and system management bus 734 can also be utilized to implement the functionality described above with regard to FIGS. 1-5.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 7, can include other components that are not explicitly shown in FIG. 7, or might utilize an architecture completely different than that shown in FIG. 7.

Based on the foregoing, it should be appreciated that technologies for remotely disabling execution of firmware components have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
    identifying, by way of a firmware driver executing on a computing system and at a boot time of the computing system, components of a firmware to be executed on the computing system, the computing system comprising a baseboard management controller (BMC), the BMC configured to communicate with a remote management client via an out-of-band (OOB) network connection;
    obtaining, by way of the firmware driver, performance data for the identified components of the firmware to be executed on the computing system;
    transmitting from the firmware driver to the BMC an inventory identifying the components and the performance data;
    receiving, from the BMC at the firmware driver, an indication that an identified one of the components is not to be executed at a next boot of the computing system, the indication generated based, at least in part, on the performance data, wherein the BMC receives the indication that the identified one of the components is not to be executed from the remote management client via the OOB network connection;
    preventing, by way of the firmware, execution of the identified one of the components not to be executed during the next boot of the computing system; and
    preventing, by way of the firmware, execution of one or more other components of the firmware that are dependent on the identified one of the components not to be executed during the next boot of the computing system.

2. The computer-implemented method of claim 1, wherein the components comprise firmware drivers.

3. The computer-implemented method of claim 1, wherein the components comprise system management interrupt (SMI) handlers.

4. The computer-implemented method of claim 1, wherein the inventory and the performance data are expressed using a JavaScript Object Notation (JSON) format based on an Open Data Protocol (OData).

5. A non-transitory computer-readable storage medium having computer-executable instructions stored thereupon which, when executed by a computing system, cause the computing system to:
- identify, by way of a firmware driver executing on the computing system and at a boot time of the computing system, a plurality of components of a firmware to be executed on the computing system, the computing system comprising a baseboard management controller (BMC), the BMC configured to communicate with a remote management client via an out-of-band (OOB) network connection;
- obtain, by way of the firmware driver, performance data for the identified plurality of components of the firmware to be executed on the computing system;
- transmit from the firmware driver to the BMC an inventory identifying the identified plurality of components and the performance data to the BMC;
- receive an indication from the BMC at the firmware driver that a component of the firmware executing on the computing system is not to be executed at a next boot of the computing system, the indication generated based, at least in part, on performance data for the components of the firmware to be executed on the computing system, wherein the BMC receives the indication that the component of the firmware is not to be executed from the remote management client via the OOB network connection;
- responsive to receiving the indication, add data, by way of the firmware driver, identifying the component to a blacklist stored by the firmware;
- prevent, by way of the firmware, execution of the component not to be executed during the next boot of the computing system; and
- prevent, by way of the firmware, execution of one or more of the plurality of components of the firmware that are dependent on the component not to be executed during the next boot of the computing system.

6. The non-transitory computer-readable storage medium of claim 5, wherein the component and the plurality of components comprise firmware drivers.

7. The non-transitory computer-readable storage medium of claim 5, wherein the component and the plurality of components comprise system management interrupt (SMI) handlers.

8. The non-transitory computer-readable storage medium of claim 5, wherein the inventory and the performance data are expressed using a JavaScript Object Notation (JSON) format based on an Open Data Protocol (OData).

9. A computing system, comprising:
- one or more processors;
- a baseboard management controller (BMC) configured to communicate with a remote management client via an out-of-band (OOB) network connection; and
- at least one non-transitory computer-readable storage medium having computer-executable instructions stored thereupon which, when executed by the one or more processors, cause the computing system to:
  - identify, by way of a firmware driver executing on the computing system and at a boot time of the computing system, components of a firmware to be executed on the computing system;
  - obtain, by way of the firmware driver, performance data for the identified components of the firmware to be executed on the computing system;
  - transmit from the firmware driver to the BMC an inventory identifying the components of the firmware to be executed on the computing system and the performance data to the BMC;
  - receive an indication at the firmware driver from the BMC that a component of the firmware executing on the computing system is not to be executed during a next boot of the computing system, the indication generated based, at least in part, on the performance data for the identified components of the firmware to be executed on the computing system, wherein the BMC receives the indication that the component of the firmware is not to be executed from the remote management client via the OOB network connection;
  - responsive to receiving the indication, adding data by way of the firmware driver that identifies the component not to be executed to a blacklist stored by the firmware;
  - prevent, by way of the firmware, execution of the component not to be executed during the next boot of the computing system; and
  - prevent, by way of the firmware, execution of one or more of the components of the firmware that are dependent on the component not to be executed during the next boot of the computing system.

10. The computing system of claim 9, wherein the component and the plurality of components comprise firmware drivers.

11. The computing system of claim 9, wherein the component and the plurality of components comprise system management interrupt (SMI) handlers.

12. The computing system of claim 9, wherein the inventory and the performance data are expressed using a JavaScript Object Notation (JSON) format based on an Open Data Protocol (OData).

* * * * *